Patented Sept. 5, 1939

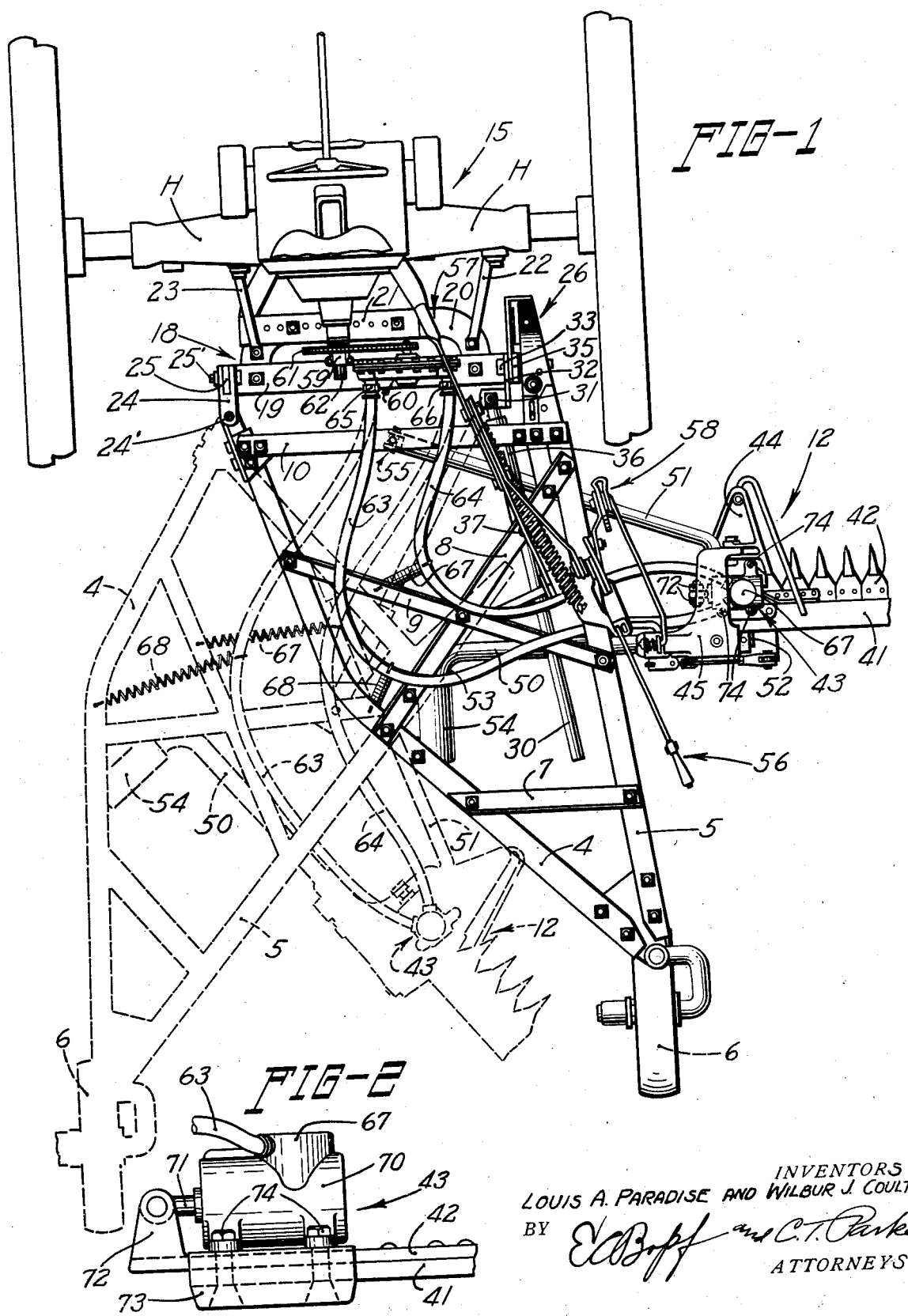

2,171,761

UNITED STATES PATENT OFFICE 2,171,761

MOWER

Louis A. Paradise and Wilbur J. Coultas, Moline, Ill., assignors to Deere & Company, Moline, Ill., a corporation of Illinois Application June 4, 1937, Serial No. 146,352

12 Claims. (Cl. 56—25)

The present invention relates to tractor-mounted implements and more particularly to mowers of the type comprising a tractor mounted frame adapted to swing both vertically and horizontally relative to the tractor and supporting a laterally extending cutting mechanism driven by power derived from the tractor power take-off shaft. A mower of this general type is disclosed in Patents Nos. 1,946,541 and 1,946,544, dated February 13, 1934. In this type of mower, the cutter bar and supporting frame are so connected to the tractor that they are free to swing vertically with respect to the tractor as the implement is drawn over uneven ground, and also free to swing horizontally about a vertical pivot when the cutter bar strikes an obstruction.

In mechanical transmissions of the type in common use for conveying power from the power take-off shaft on the tractor to the cutting mechanism, it is necessary to use a double universal joint and splined telescoping shafts to obtain the flexibility of drive required by such a free-moving mechanism.

The principal object of the present invention is to provide a completely flexible drive with the elimination of all universal joints and splined shafts. In the accomplishment of this object, the cutting mechanism is driven by a pressure actuated motor such as a fluid motor, the power for which is derived from a pressure generating device such as a fluid pump, driven by the power take-off shaft of the tractor. The coupling between the fluid motor, which is mounted on the freely moving cutting mechanism, and the fluid pump is by means of flexible hose which permits a wide range of deflection with no loss of power.

More specifically, the object of our invention has to do with positioning the pump and the motor where they will effectively eliminate the necessity for flexible mechanical connections, other than the above mentioned hose, for transmitting power between parts which are relatively movable during operation. A related object is concerned with positioning the parts of the fluid pressure system in permanent locations on the mower itself to eliminate any necessity for disconnecting hose connections when uncoupling the implement from the tractor.

These objects are accomplished by permanently mounting the fluid pump on the draft frame of the mower. This frame is adapted to be rigidly fixed to the rigid draft frame of the tractor, therefore there is no relative movement between the tractor and the pump during operation. The pump is connected to the power take-off shaft of the tractor by a simple driving chain connection. The fluid motor is mounted on the cutter bar and hence can be connected directly to the sickle. Thus the flexible hose connection between the pump and the motor accommodates both the vertical swinging of the cutter bar relative to the supporting frame and also the horizontal swinging of the cutter bar and frame relative to the draft frame when the cutter bar strikes an obstruction.

These and other objects and advantages of our invention will be apparent after a consideration of the following detailed description of a specific embodiment of our invention, in which reference is made to the drawing appended hereto, in which Figure 1 is a plan view of a mower embodying our invention and mounted on a tractor. In broken lines is shown the position the cutting mechanism and supporting frame take when the cutter bar strikes an obstruction and is released to swing back out of the way; and Figure 2 is a fragmentary side elevation of a fluid motor showing the manner in which it is mounted on the cutter bar to operate the sickle.

The mower shown in Figure 1 comprises two rearwardly converging frame members 4 and 5, which are joined at their rear ends and supported on a caster wheel 6. Suitable cross bracing members 7, 8, 9, and 10 give the frame rigidity and provide means for attaching the cutting mechanism 12. This frame is connected to a tractor 15 by means of a draft frame 18 comprising a transverse member 19, which is rigidly fixed to a U-shaped member 20, which in turn is secured to the tractor cross bar 21 and rigidly braced by two bracing members 22 and 23, extending from the member 20 to the rear axle housings H. The mower frame supporting the cutting mechanism is connected to the draft frame 18 by means of a shackle 24, which is pivotally connected by a vertical bolt 24′ to the forward end of the left frame member 4 to permit horizontal swinging movement, and pivotally connected to the upturned end 25 of the transverse member 19 by a horizontal bolt 25′ to permit vertical swinging movement. Thus it can be seen that the shackle 24 acts as a universal joint connection between the frame and draft members.

The forward end of the right frame member 5 is supported on the draft frame 18 and secured thereto by means of a latch 26, not shown in detail here but fully disclosed in Patent No. 1,946,544, dated February 13, 1934. The function of the latch 26 is to transmit draft to the mower under ordinary working conditions, but to release when suddenly overloaded, as when the mower strikes a solid obstruction. As the mower is drawn over uneven ground, it is free to move vertically with respect to the tractor to accommodate itself to irregularities in the surface, and to swing horizontally with respect to the tractor when an obstruction is met sufficient to release the latch.

Should the latch 26 become released and the mower frame swung around to the position shown in Figure 1 in broken lines, it is returned to proper operating position and the latch re-engaged by backing the tractor up to the frame. A diagonally rearwardly extending guide rod 30 is pivotally connected by means of a vertical pivot bolt 31 to a bracket 32, which is connected by a horizontal pivot bolt 33 to the upturned end 35 of the transverse member 19. This guide rod 30 is in sliding telescopic engagement with a cylindrical sleeve 36 which is pivotally connected to the mower frame across brace 8 by means of a vertical pivot bolt 37, and acts to guide the two frame elements together so that the latch may be engaged without requiring the operator to leave the seat of the tractor.

The mower cutting mechanism 12 comprises a laterally extending cutter bar 41 which supports a reciprocating sickle 42 driven by a fluid motor 43 mounted on the said cutter bar. The cutter bar 41 is supported on a shoe 44 which is pivotally connected to a shoe arch 45 so as to permit the cutter bar and shoe to swing in a transverse vertical plane relative to the shoe arch.

Connecting the cutting mechanism 12 to the mower frame is a transversely disposed drag bar 50 and a diagonally forwardly extending brace rod 51. One end 52 of the transverse drag bar 50 is extended horizontally and journaled in the shoe arch 45 to permit rotation of the shoe arch in a longitudinal vertical plane. The other end 53 of the drag bar 50 is bent rearwardly at a substantially right angle and journaled in a longitudinally disposed bearing 54 which is fixed to the left frame member 4 and the cross brace 8 so that the drag bar 50 can be rotated in a transverse vertical plane relative to the mower frame.

The brace rod 51 is journaled in the shoe arch 45 to permit swinging of the shoe arch in a transverse vertical plane relative to the frame, while the other end 55 is pivotally connected to the frame cross brace member 10 for swinging movement both vertically and horizontally. From this it can be seen that the shoe arch, together with the cutting mechanism, is free to rise and fall relative to the mower frame as the implement is drawn over an irregular surface.

Adjustments regulating the angle of contact of the cutting mechanism to the ground are made through the agency of a lever 58 and suitable linkage connected to the shoe arch 45. This is disclosed in detail in Patent No. 1,946,541, dated February 13, 1934, as are means for raising and lowering the cutting mechanism relative to the mower frame, by means of a lever 56 and a foot lever 57.

Coming now to that portion of the implement with which our invention is more directly concerned, a fluid pump 60 is fixedly mounted on the mower draft frame cross member 19, so that the drive shaft of the pump is parallel to the tractor power take-off shaft 62 by which it is driven to supply fluid pressure to the motor 43 on the cutting mechanism 12. As previously described, the mower draft frame is a rigid structure, fixedly connected to the tractor cross bar 21, which is in rigid relation to the frame of the tractor 15. Thus it is evident that the fluid pump 60 which is mounted on the cross member 19 is in fixed relation with its drive shaft parallel to the tractor power take-off shaft 62 at all times, requiring only a simple sprocket and chain drive to transmit power. In this particular embodiment of the invention, a hydraulic pump is indicated, although any other suitable source of actuating pressure might be used such as, for example, pneumatic or electrical pressure.

The sprocket wheel 59 mounted on the splined power take-off shaft 62 is of the type adapted to be slipped over the end of a shaft and clamped in position, with projections cooperating with the splines to prevent rotational slippage. Any suitable means, such as a set screw, may be used to clamp the sprocket in position along the longitudinal axis of the power take-off shaft and maintain it in alignment with the sprocket wheel on the drive shaft of the fluid pump.

In order to transmit fluid pressure from the pump 60 to the fluid motor 43, two flexible hose lines 63 and 64 are provided, which are coupled to the pump through an intake connection 65 and an outlet connection 66. These hose lines are connected to the valve housing 67 of the fluid motor 43, supplying the motor with fluid under pressure and returning the fluid to the pump. The hose lines are held up out of the way of other operating gear and prevented from fouling or interfering with its free operation by means of two tension springs 67 and 68, connected respectively to a cross bracing frame member 9 and the left longitudinal frame member 4. When the distance between the pump 60 and the fluid motor 43 is increased, as when the frame swings back on striking an obstruction, the slack in the hose lines is taken up, and the restraining springs 67 and 68 stretch to permit the hose lines to assume more nearly straight line positions. This action is illustrated in the broken line drawing in Figure 1.

The fluid motor shown in this embodiment of the present invention and illustrated more clearly in Figure 2, is of the reciprocating type comprising a cylinder 70, a piston, (not shown) and a piston rod 71 connected to the upturned end 72 of the sickle bar 42 and imparting a reciprocating motion to it. Within the valve housing 67 is a suitable arrangement of valves directing the oil pressure to one side of the piston for the power stroke in one direction, and to the other side of the piston for the power stroke in the opposite direction. As the design or construction of the motor has no bearing on the present invention, no attempt is made to describe it in detail here. It is not intended to limit the invention to this particular type of pressure-actuated motor, and any suitable motor, hydraulic, pneumatic, or electrical, might be used to reciprocate the sickle bar 42. The fluid motor 43 is mounted on the cutter bar 41 by means of a mounting bracket 73 and mounting bolts 74.

In operation it will be seen that a mower embodying the present invention has a number of advantages over those employing mechanical power transmissions between the tractor power take-off shaft and the cutting mechanism. The mower is quickly and easily mounted on a tractor, requiring only a simple draft connection and the attachment of the sprocket gear driving the pump to the splined power take-off shaft. The fluid pump is an integral part of the mower, making it unnecessary to connect or disconnect fluid pressure lines. All universal joints and telescoping splined shafts have been eliminated from the power transmission, yet complete flexibility of transmission has been secured.

We do not intend our invention to be limited to the details shown and described in connection with this embodiment except as limited by the following claims.

We claim:

1. An implement attachment for a tractor having a body, a draft frame rigidly fixed thereto, and an engine driven power take-off shaft extending out of said body, said implement attachment comprising a draft member, means for coupling said draft member to said tractor draft frame and preventing relative movement between said member and said frame, an implement frame, means for connecting said implement frame with said draft member providing for a limited relative movement between said implement frame and said draft member during normal operation, operating mechanism mounted on said implement frame, and means for transmitting power from said tractor to said mechanism including a pressure generating device, means for fixedly attaching said device to said draft member, means for operatively connecting said device to said power take-off shaft to receive power therefrom, a pressure actuated motor supported on said implement frame and connected to drive said operating mechanism, and flexible conduit means interconnecting said pressure generating device and said motor for transmitting power therebetween.

2. For use with a tractor having an engine driven power take-off shaft, an implement attachment comprising a draft member adapted for rigid attachment with said tractor, an implement frame, means for pivotally connecting said frame to said draft member for swinging movement relative thereto, a reciprocating tool, means for pivotally connecting said tool with said implement frame for swinging movement therebetween, and means for transmitting power from said tractor to said tool including a pressure generating device mounted on said draft member and removable from the tractor with said draft member, a driving wheel fixed to said power take-off shaft, a driven wheel associated with said pressure generating device, a flexible endless member interconnecting said wheels for transmitting power to said generating means, a pressure actuated motor mounted on said tool and connected to actuate the same, and flexible conduit means interconnecting said generating device and said motor for transmitting power therebetween.

3. For use with an engine driven vehicle having a power take-off shaft, an implement attachment comprising an operating mechanism, means for transmitting draft from said vehicle to said operating mechanism including a draft member, means for pivotally connecting said operating mechanism to said draft member providing for both lateral and vertical swinging movement of said mechanism relative to said draft member, and means for detachably connecting said draft member to said vehicle, and means for transmitting power from said power take-off shaft to said operating mechanism including a pressure generating device mounted on said draft member and detachable from said vehicle therewith, detachable means for operatively connecting said device to said power take-off shaft to receive power therefrom, a pressure actuated motor device associated with said operating mechanism and connected to drive the same, and flexible conduit means interconnecting said devices for transmitting power therebetween.

4. For use with an engine driven vehicle having a power take-off shaft, an implement attachment comprising an operating mechanism, means for transmitting draft from said vehicle to said operating mechanism including a draft member, means for pivotally connecting said operating mechanism to said draft member providing for swinging movement of said mechanism relative to said draft member, and means for detachably connecting said draft member to said vehicle, and means for transmitting power from said power take-off shaft to said operating mechanism including a fluid pump mounted on said draft member and detachable from said vehicle therewith, detachable means for operatively connecting said pump to said power take-off shaft to receive power therefrom, a fluid motor associated with said operating mechanism and connected to drive the same, and flexible hose permanently interconnecting said pump and said motor for transmitting fluid therebetween.

5. An implement attachment for a tractor having a power take-off shaft, said implement attachment comprising a cutter bar, a sickle reciprocatively cooperative therewith, means for transmitting draft from said tractor to said cutter bar including a draft member, means for pivotally connecting said cutter bar to said draft member providing for vertical swinging movement and fore and aft rocking movement of said cutter bar relative to said draft member, and means for detachably connecting said draft member to said tractor, and means for transmitting power from said power take-off shaft to said sickle including a pressure generating device mounted on said draft member and removable from the tractor therewith, detachable means for operatively connecting said device to said power take-off shaft to receive power therefrom, a pressure actuated motor device mounted on said cutter bar and connected to drive said sickle, and flexible conduit means interconnecting said device for transmitting power therebetween.

6. A mower attachment for a tractor having a power take-off shaft, said mower attachment comprising a cutter bar, a sickle reciprocatively cooperative therewith, a supporting frame for said cutter bar, means for pivotally connecting said cutter bar to said frame for swinging movement in a vertical plane, a draft member, detachable means for rigidly attaching said member on said tractor for preventing relative movement therebetween, means for pivotally connecting said frame to said draft member for vertical and lateral swinging movement relative thereto, and means for transmitting power from said power take-off shaft to said sickle including a fluid pump mounted on said draft member and removable from said tractor therewith, detachable means for operatively connecting said pump to said power take-off shaft to receive power therefrom, a fluid motor mounted on said cutter bar and connected to drive said sickle, and flexible hose interconnecting said pump and said motor for transmitting fluid therebetween.

7. A mower attachment for a tractor having a power take-off shaft, said mower attachment comprising a cutter bar, a sickle reciprocatively cooperative therewith, a supporting frame for said cutter bar, means for pivotally connecting said cutter bar to said frame for swinging movement in a vertical plane, a draft member, detachable means for rigidly attaching said member on said tractor for preventing relative movement therebetween, means for pivotally connecting said frame to said draft member for swinging movement in a horizontal plane, means for normally restraining said horizontal swinging movement, said restraining means being adapted to be disabled when said cutter bar encounters excessive resistance to forward motion, and means for transmitting power from said power take-off shaft to said sickle comprising a fluid pump mounted on said draft member independent of said supporting frame but removable from the tractor with the mower attachment, detachable means for operatively connecting said pump to said power take-off shaft to receive power therefrom, a fluid motor mounted on said cutter bar and connected to drive said sickle, and flexible hose interconnecting said pump and said motor for transmitting fluid therebetween.

8. A mower attachment for a tractor having a power take-off shaft, said mower attachment comprising a cutter bar, a sickle reciprocatively posed behind said tractor, means for pivotally connecting said cutter bar to said frame for swinging movement in a vertical plane, means for supporting the forward end of said frame on said tractor including a draft member adapted to be rigidly fixed to said tractor but readily detachable therefrom, means for pivotally connecting said frame to said member for swinging movement in a horizontal plane, means for normally restraining said horizontal swinging movement, said restraining means being adapted to be disabled when said cutter bar encounters excessive resistance to forward motion, ground engaging means for supporting the rear end of said frame, and means for transmitting power from said power take-off shaft to said sickle comprising a fluid pump mounted on said draft member independent of said supporting frame but removable from the tractor with the mower attachment, detachable means for operatively connecting said pump to said power take-off shaft to receive power therefrom, a fluid motor mounted on said cutter bar and connected to drive said sickle, and flexible hose interconnecting said pump and said motor for transmitting fluid therebetween.

9. For use with a tractor having an engine driven power take-off shaft, an implement attachment comprising a draft member adapted for rigid attachment with said tractor, an implement frame, means for connecting said implement frame with said draft member providing for a limited relative movement between said implement frame and said draft member during normal operation, a power-driven tool supported on said frame for operative movement relative thereto, and means for transmitting power from said tractor to said tool including a pressure generating device mounted on said draft member in a position adjacent said tractor power take-off shaft when said draft member is coupled to the tractor but removable from the tractor with said draft member, a driven wheel associated with said pressure generating device, a driving wheel adapted for mounting on said power take-off shaft and adjustable axially on the latter for proper alignment with said driven wheel, a flexible endless member interconnecting said wheels for transmitting power therebetween, a pressure actuated motor supported on said implement frame and operatively connected to drive said tool, and flexible conduit means interconnecting said generating device and said motor for transmitting power therebetween.

10. A mower attachment for a tractor having a power take-off shaft, said mower attachment comprising a cutter bar, a sickle cooperative therewith, a supporting frame for said cutter bar, means for pivotally connecting said cutter bar to said frame for vertical swinging movement relative thereto, a draft member, means for pivotally connecting said supporting frame with said draft member for vertical swinging movement relative thereto, means for attaching said draft member to the tractor, said supporting frame being carried at one end thereof on said pivotal connecting means and at the other end thereof on ground engaging wheel means whereby said frame is adapted to follow the contour of the ground and to rise and fall relative to the tractor as the latter advances, a fluid pressure generating device mounted rigidly with respect to said tractor, means operatively connecting said device with the tractor power take-off shaft for receiving power therefrom, a fluid pressure actuated motor mounted on said cutter bar and connected to drive said sickle, and flexible conduit means interconnecting said generating device and said motor for conveying fluid therebetween.

11. A mower attachment for a tractor having a power take-off shaft, said mower attachment comprising a cutter bar, a sickle reciprocatively cooperative therewith, a supporting frame, means for pivotally connecting said cutter bar to said frame for swinging movement in a vertical plane, means for supporting one end of said frame on said tractor including a draft member adapted to be rigidly fixed to said tractor but readily detachable therefrom, means for pivotally connecting said supporting frame to said draft member providing for vertical and horizontal swinging movement relative thereto, means for normally restraining said horizontal swinging movement, said restraining means being adapted to be disabled when said cutter bar encounters excessive resistance to forward motion, ground engaging means for supporting the other end of said frame, and means for transmitting power from said power take-off shaft to said sickle comprising a fluid pump mounted on said draft member independent of said supporting frame but removable from the tractor with the mower attachment, detachable means for operatively connecting said pump to said power take-off shaft to receive power therefrom, a fluid motor mounted on said cutter bar and connected to drive said sickle, and flexible hose interconnecting said pump and said motor for transmitting fluid therebetween.

12. A mower attachment for a tractor having a power take-off shaft, said mower attachment comprising a cutter bar, a sickle reciprocatively cooperative therewith, a supporting frame, means for pivotally connecting said cutter bar to said frame for swinging movement in a vertical plane, means for supporting one end of said frame on said tractor including a draft member adapted to be rigidly fixed to said tractor but readily detachable therefrom, means for pivotally connecting said supporting frame to said draft member providing for vertical and horizontal swinging movement relative thereto, means for normally restraining said horizontal swinging movement, said restraining means being adapted to be disabled when said cutter bar encounters excessive resistance to forward motion, ground engaging means for supporting the other end of said frame, and means for transmitting power from said power take-off shaft to said sickle comprising a fluid pump mounted on said draft member in a position adjacent to the tractor power take-off shaft when said draft member is coupled to the tractor but removable from the tractor with said mower attachment, a driven wheel associated with said fluid pump, a driving wheel mounted on said power take-off shaft and adjustable axially thereon into proper alignment with said driven wheel, flexible endless power transmitting means interconnecting said wheels, a fluid motor mounted on said cutter bar and connected to drive said sickle, and flexible hose interconnecting said pump and said motor for transmitting fluid therebetween.

LOUIS A. PARADISE.
WILBUR J. COULTAS.